July 3, 1951     W. W. WHITE     2,558,890
WHEELED DISK HARROW

Filed May 15, 1946     4 Sheets-Sheet 1

INVENTOR.
*William W. White,*
BY *Victor J. Evans & Co.*
ATTORNEYS

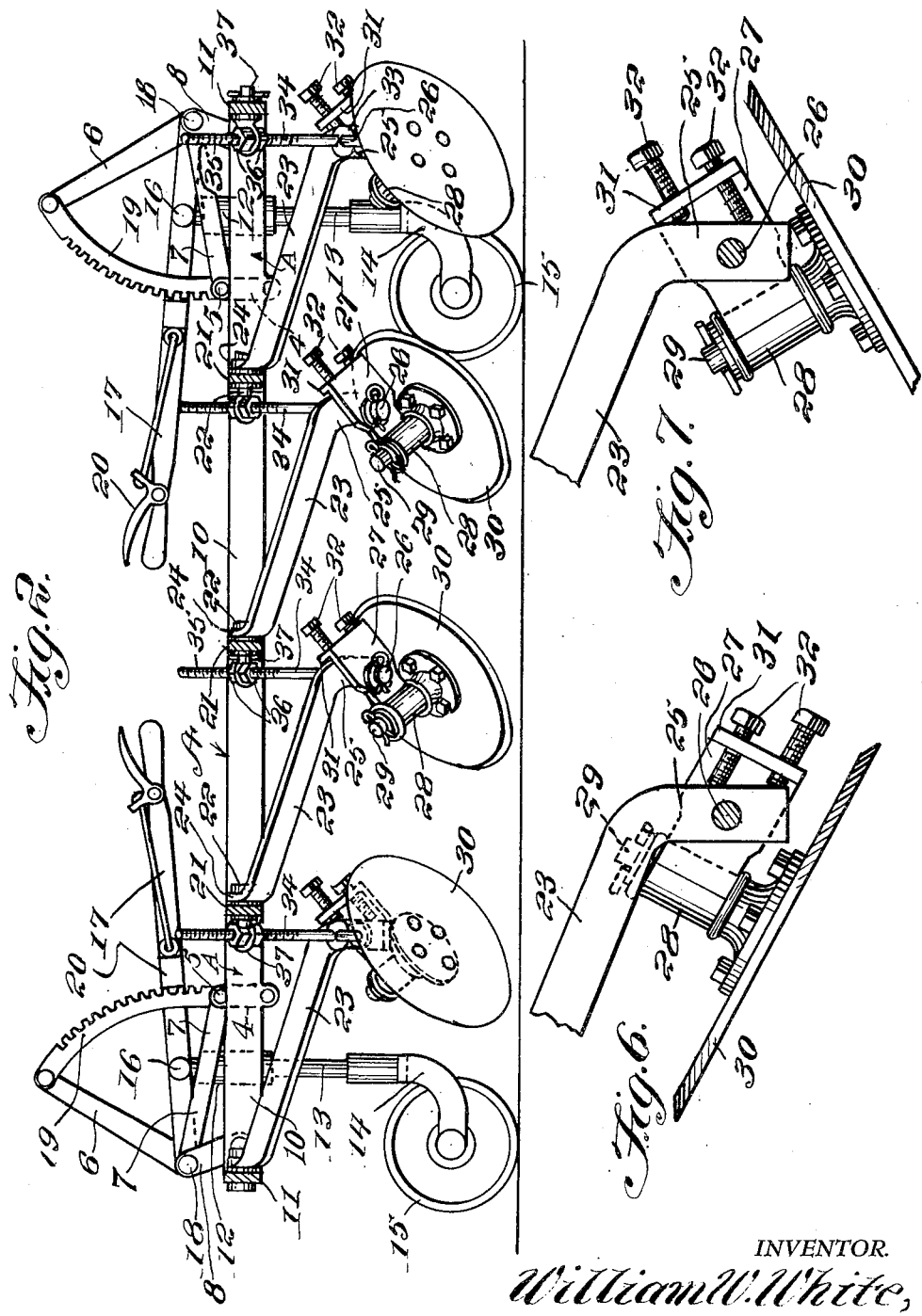

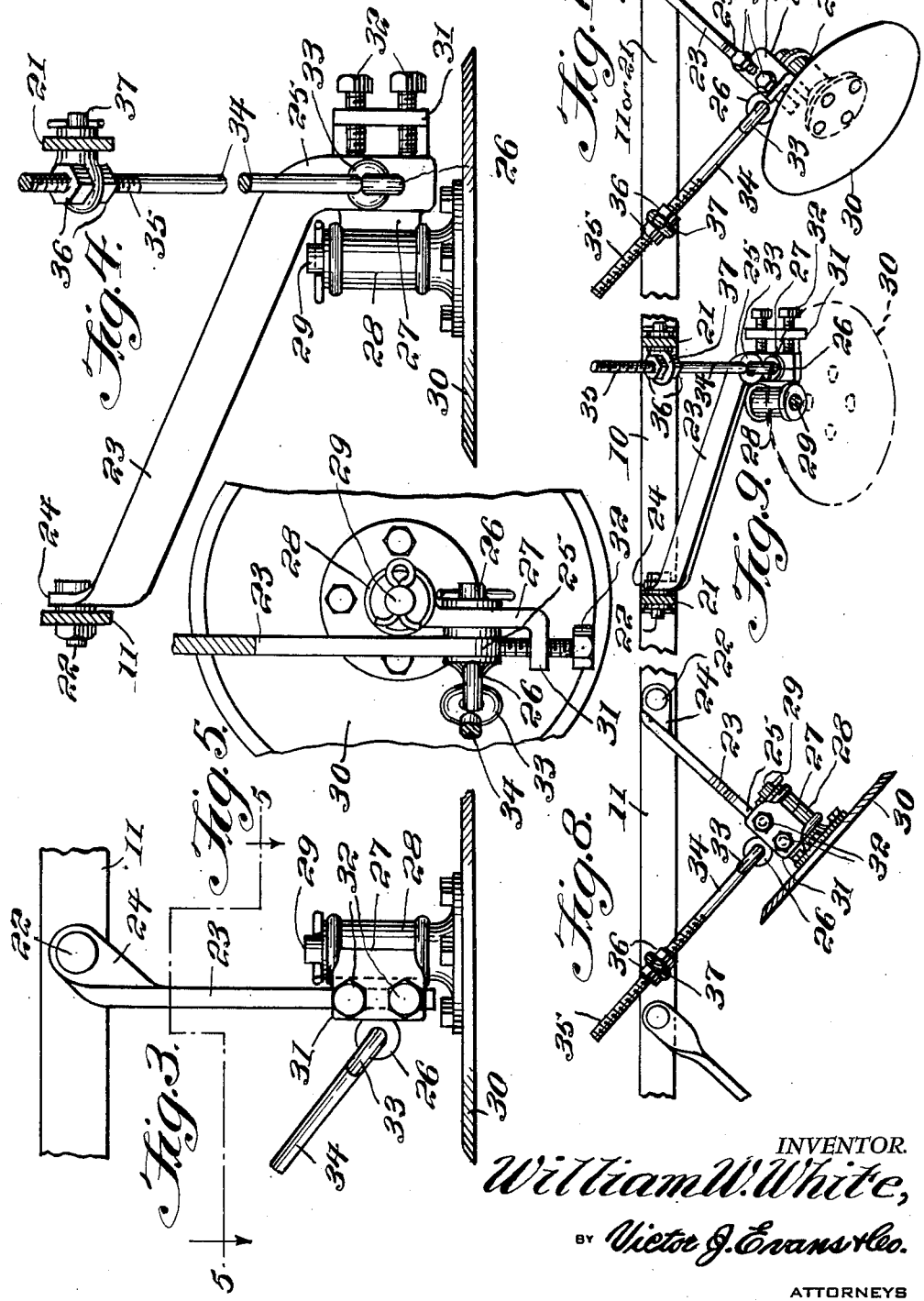

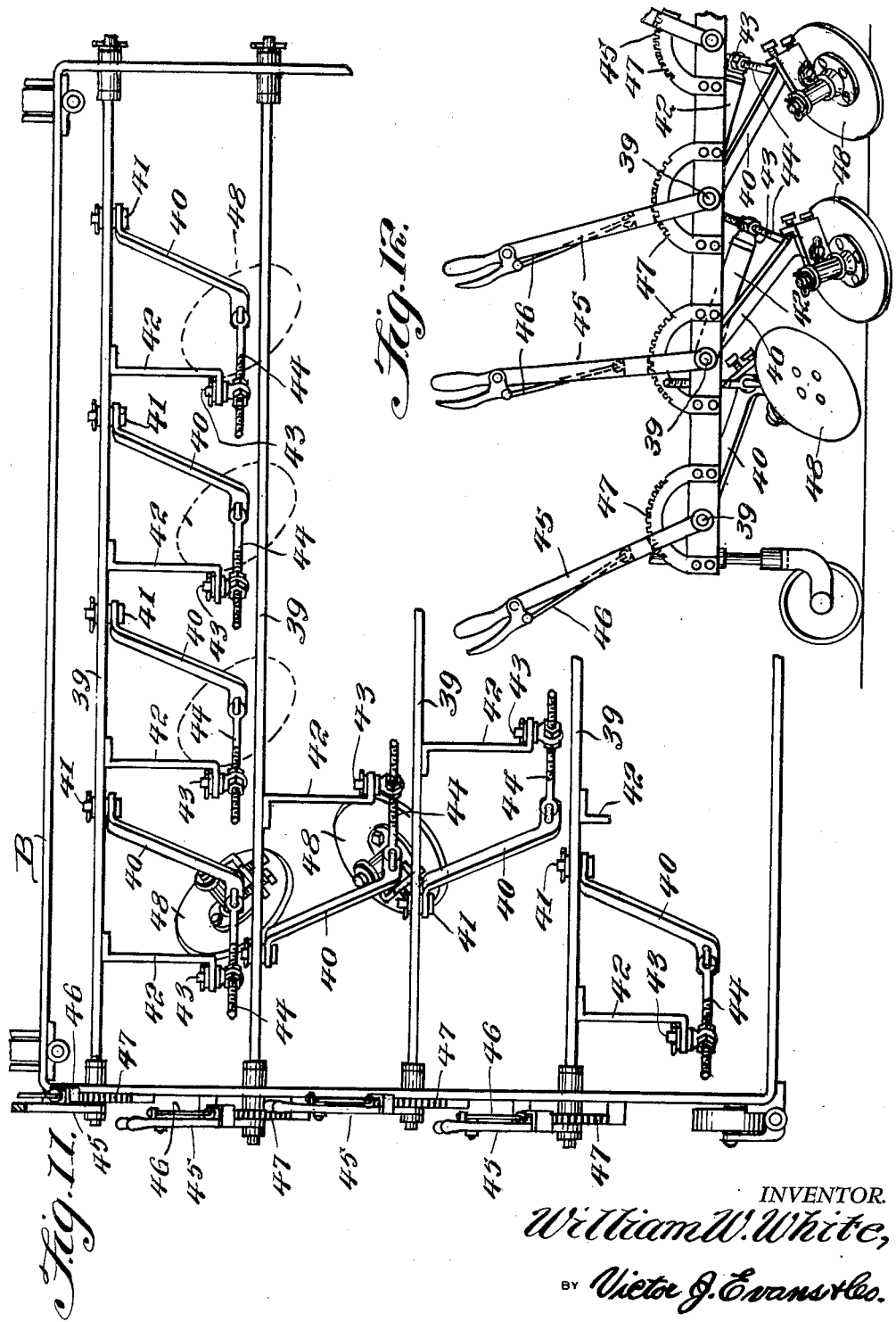

Patented July 3, 1951

2,558,890

UNITED STATES PATENT OFFICE 2,558,890

WHEELED DISK HARROW

William W. White, Great Falls, Mont.

Application May 15, 1946, Serial No. 669,959

2 Claims. (Cl. 55—73)

The invention relates to a ground working implement and more especially, a gang disk-harrow.

The primary object of the invention is the provision of an implement of this character, wherein the rotary disks are arranged in transverse rows with respect to the line of draft, and the groups of the disks of each row are susceptible of adjustment to vary the angular disposition thereof to the soil to be worked thereby, while the disks of one row are staggered to the disks of the other rows of disks adjacent thereto, thus enabling the thorough working of the soil during the advancement of the implement thereover.

Another object of the invention is the provision of an implement of this character, wherein the disks can be raised or lowered with relation to the ground, and such implement operates upon the latter as a cultivator for deep and shallow cutting of the earth, with resultant pulverizing the same, cutting the weeds, and requiring a slight draw-bar pull for the successful operation of such implement.

A further object of the invention is the provision of an implement of this character which is simple in construction, thoroughly reliable and efficient in operation, strong, durable, readily and easily handled under draft, conveniently adjusted for deep or shallow cutting, compact, it being possessed of few parts, thus economical in repairs, and inexpensive to manufacture.

With these and other objects in view, the invention consists in the features of construction, combination and arrangement of parts as will be hereinafter more fully described, illustrated in the accompanying drawings, which show the preferred embodiment of the invention, and pointed out in the claims hereunto appended.

In the accompanying drawings:

Figure 2 is a side view;

Figure 3 is a fragmentary enlarged plan view of one of the disk cutters;

Figure 4 is a view of the parts shown in Figure 3, but differently positioned;

Figure 5 is a sectional view taken on the line 5—5 of Figure 3;

Figure 6 is an edge view with the disk in one adjusted position;

Figure 7 is a view similar to Figure 6 showing the disk in another adjusted position;

Figures 8, 9 and 10 are views similar to Figure 7 showing the cutter in various angular adjusted positions;

Figure 11 is a fragmentary view similar to Figure 1 showing a slight modification;

Figure 12 is a fragmentary side view thereof.

Similar reference characters indicate corresponding parts throughout the several views in the drawings.

Figure 1:
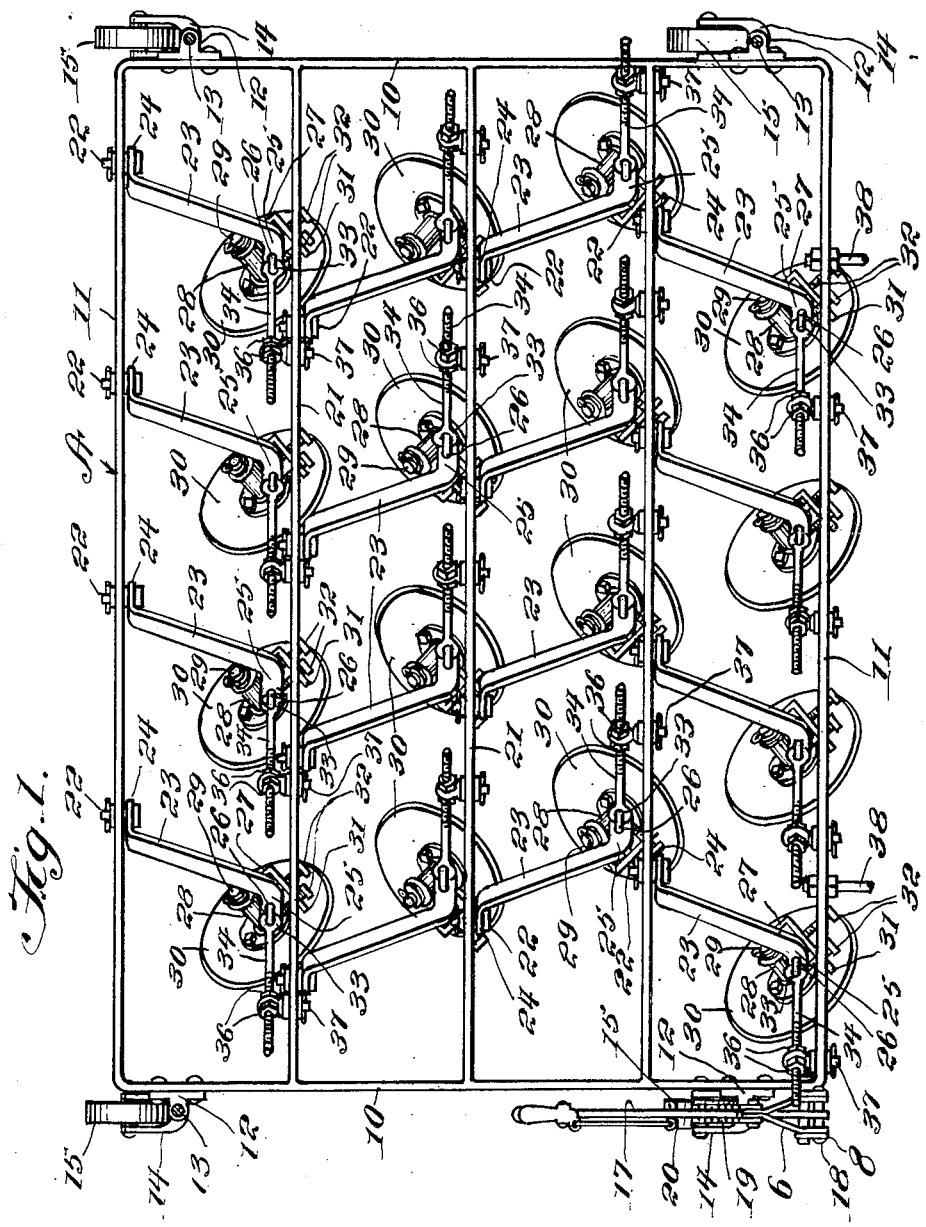
Figure 1 is a top plan view of the implement constructed in accordance with the invention.

Referring to the drawings in detail, particularly Figures 1 to 10, inclusive, the implement constituting the present invention comprises a substantially rectangular or elongated shaped main frame denoted generally at A, preferably made from scrap iron, having the straight side rails 10 and straight front and rear rails 11, respectively, these being unitary with each other to give rigidity to such frame. Near the corners of the frame A and secured to the rails thereof are brackets 12 constituting fittings for the wheel fork stems 13, each swivel fork 14 of which has journalled therein a castor wheel 15, while the stem 13 is vertically adjustable through pivot connection 16 with a raising and lowering lever 17. The lever 17 is pivotally connected to a link 8 by a pivot pin 18, the link 8 being pivotally connected to the frame A. The pin 18 also pivotally connects the lever 17 to an end of a brace 7 and to an arm 6 which is part of a toothed keeper segment 19. A pin 5 pivotally connects the keeper segment 19 and the other end of the brace 7 to a second link 4, the link 4 being pivotally connected to the frame A. The lever 17 is built with a hand releasable latching device 20 for engaging the segment 19 so that the lever can be latched in a raised or lowered adjusted position, and in this manner the frame A is raised or lowered relative to the ground.

Built into the frame A transversely to the line of draft of the same are uniformly spaced intermediate rails 21 and to these and the front rail 11 of the frame by swivel pins 22 are connected gangs of spaced elbowed hanger arms 23, each having reversely angled thereto, terminal portions 24 and 25, respectively, and to each portion 25 is pivoted by a pin 26 the extension wing or ear 27 of a swingable hub 28, in which is journalled the stub axle 29 of a disk-like rotatable cutter 30. The wing or ear 27 has a crowning flange 31 in which are adjustably engaged set screws 32 adapted to contact the portion 25 to hold the hub 28 in an adjusted swung position, as will appear from Figures 4 to 10 of the drawings.

Each wing or ear 27 has loosely stapled thereby at 33 an adjustable linking rod 34, its threaded end 35 being nut locked at 36 in a swivel eye 37 mounted in a rail of the frame A or in the rail 21 companion to such rod 34. This rod 34 enables the adjustment of the arm 23, as should appear from Figures 8 to 10 of the drawings. These arms 23 set the ganged relation of the same with respect to the frame A and in angular disposition thereto, while the set screws 32 adjust the hubs 28 to dispose the cutters 30 in the gangs angularly to the lay of the ground and with relation to each other, so that such cutters can be ganged in the relationship as shown in Figure 1 of the drawings.

The frame A with the gangs of cutters 30 can be advanced by any suitable draft through a hitch, only a part of the latter being indicated at 38 in Figure 1 of the drawings.

In Figures 11 and 12 of the drawings, there is shown a modification of the invention, wherein the rails 39 which are substitutes for the rails 21 are turnably journalled in the frame B, which is similar to the frame A, and the arms 40 are swivelled at 41 to such rails 39, while these rails also carry brackets 42 for the swivel eyes 43, in which are adjustably fitted the linking rods 44. The rails 39 each has fixed to one end a throw lever 45 built with a hand released latching device 46 engageable with a toothed keeper segment 47 fixed on the frame at one end thereof, thus the cutters 48 can be raised and lowered in their individual gangs through manual operation of the throw levers 45 common to such gangs.

The implement can cut the soil deep or shallow at the option of the user thereof, and also will cut weeds and other growing waste, the said implement being readily and easily adjusted, either as to the individual cutters or in gangs, and is usable as a ground working agricultural machine.

What is claimed is:

1. A gang disk harrow of the kind described comprising a main frame having intermediate cross rails therein, elbow arms pivoted to the frame and side rails, a plurality of hubs, extension ears secured to said hubs, said hubs being pivoted to said elbow arms, pivot pins for said hubs in said extension ears, means including an adjustable linking rod, linking said elbow arms to said cross rails for adjusting said arms independently of each other, disk cutters having axles journalled in said hubs, means for adjusting said hubs independently of each other, said means comprising a plurality of pairs of screw-threaded set screws, each pair of said set screws being screw-threadedly held in an extension ear, but being laterally movable with respect thereto, the individual set screws of each pair being disposed on opposite sides of said pivot pin and bearing against said elbow arm, whereby movement of said set screws with respect to said extension ear will adjust the angular position of said hub with respect to said elbow arm, adjustable castor wheels carried by said frame, means including a slidable axle for raising and lowering said castor wheels relative to said frame, and means for swinging said arms in gangs.

2. A gang disk harrow of the kind described, comprising a main frame having intermediate cross rails therein, elbow arms pivoted to said frame and said rails, a plurality of hubs, extension ears secured to said hubs, said hubs being pivoted to said elbow arms at a pivot pin in said extension ears, means including an adjustable linking rod linking said elbow arms to said cross rails for adjusting said arms independently of each other, disk cutters having axles journalled in said hub, means for angularly adjusting said hubs independently of each other, said means comprising a plurality of pairs of screw-threaded set screws, said set screws being screw-threadedly engaged in said extension ears but being movable therein, one of the set screws of each pair being disposed on opposite sides of said pivot pin in said extension ear, and bearing against said elbow arm, a plurality of vertically slidable wheel fork stems secured to said main frame, swivel forks mounted at the lower ends of said fork stems, castor wheels journalled in said swivel forks, said castor wheels being vertically adjustable by sliding said fork stems with respect to said main frame, and means for swinging said elbow arms in gangs and means for latching the last-named means in adjusted positions.

WILLIAM W. WHITE.

REFERENCES CITED

The following references are of record in the file of this patent:

UNITED STATES PATENTS

| Number | Name | Date |
|---|---|---|
| 449,329 | Paterson | Mar. 31, 1891 |
| 1,216,123 | Howe | Feb. 13, 1917 |
| 1,419,585 | Paige | June 13, 1922 |
| 1,536,367 | Wulff | May 5, 1925 |